(12) United States Patent
Katsurai et al.

(10) Patent No.: US 12,316,385 B2
(45) Date of Patent: May 27, 2025

(54) OPTICAL POWER SUPPLY SYSTEM, WAKEUP METHOD AND OPTICAL COMMUNICATION DEVICE ON THE RECEIVING SIDE

(71) Applicant: Nippon Telegraph and Telephone Corporation, Tokyo (JP)

(72) Inventors: Hiroaki Katsurai, Musashino (JP); Tomoaki Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 213 days.

(21) Appl. No.: 18/036,314

(22) PCT Filed: Nov. 20, 2020

(86) PCT No.: PCT/JP2020/043461
§ 371 (c)(1),
(2) Date: May 10, 2023

(87) PCT Pub. No.: WO2022/107327
PCT Pub. Date: May 27, 2022

(65) Prior Publication Data
US 2023/0403081 A1    Dec. 14, 2023

(51) Int. Cl.
*H04B 10/00*    (2013.01)
*H04B 10/80*    (2013.01)

(52) U.S. Cl.
CPC ................... *H04B 10/80* (2013.01)

(58) Field of Classification Search
CPC .... H04B 10/80; H04B 10/806; H04B 10/807; H04B 10/808; H04B 10/40;
(Continued)

(56) References Cited

U.S. PATENT DOCUMENTS

| | | | |
|---|---|---|---|
| 8,798,460 B2 * | 8/2014 | Konno | H04L 12/12 398/25 |
| 11,757,536 B2 * | 9/2023 | Sugime | H04B 10/808 398/171 |
| 2014/0193150 A1 | 7/2014 | Mukai et al. | |

FOREIGN PATENT DOCUMENTS

| | | |
|---|---|---|
| JP | 2010193374 | 9/2010 |
| JP | 2011223631 | 11/2011 |

(Continued)

*Primary Examiner* — Hanh Phan
(74) *Attorney, Agent, or Firm* — Fish & Richardson P.C.

(57) ABSTRACT

An optical power supply system including a power supply side optical communication device that supplies power using an optical signal for power supply, and a power receiving side optical communication device that is driven by power obtained from the optical signal for power supply transmitted from the power supply side optical communication device, in which: the power supply side optical communication device includes a sleep control unit that generates a sleep cancellation signal for canceling sleep states of some functional units included in the power receiving side optical communication device, and a power supply control unit that superimposes the sleep cancellation signal on the optical signal for power supply and transmits the superimposed signal to the power receiving side optical communication device; and the power receiving side optical communication device includes a detection unit that detects the sleep cancellation signal superimposed on the optical signal for power supply, and a control unit that performs control to switch a functional unit from a sleep state to an activated state in response to the sleep cancellation signal detected by the detection unit.

17 Claims, 7 Drawing Sheets

(58) Field of Classification Search
CPC .......... H04B 10/0795; H04B 10/07955; H04B 10/27; H04J 14/02; H04J 14/0216; H04J 14/0245; H04J 14/0246; H04J 14/0249; H04Q 11/0067
USPC ...... 398/171, 66, 67, 68, 69, 70, 71, 72, 79, 398/158, 159, 33, 38, 135, 136, 137, 138, 398/139, 202, 208, 209, 25, 26, 27
See application file for complete search history.

(56) References Cited

FOREIGN PATENT DOCUMENTS

| | | |
|---|---|---|
| JP | 2017098643 | 6/2017 |
| WO | WO 2012114827 | 8/2012 |

* cited by examiner

OPTICAL POWER SUPPLY SYSTEM, WAKEUP METHOD AND OPTICAL COMMUNICATION DEVICE ON THE RECEIVING SIDE

CROSS-REFERENCE TO RELATED APPLICATIONS

This application is a National Stage application under 35 U.S.C. § 371 of International Application No. PCT/JP2020/043461, having an International Filing Date of Nov. 20, 2020.

The disclosure of the prior application is considered part of the disclosure of this application, and is incorporated by reference in its entirety into this application.

TECHNICAL FIELD

The present invention relates to an optical power supply system, a sleep cancellation method, and a power receiving side optical communication device.

BACKGROUND ART

Conventionally, an optical power supply system disclosed in Patent Literature 1 has been proposed. In the optical power supply system disclosed in Patent Literature 1, an optical network unit (ONU) can receive power supply from an optical line terminal (OLT) by receiving an optical signal for power supply (hereinafter referred to as "feed light") transmitted from the OLT. Further, in the optical power supply system disclosed in Patent Literature 1, by using the same wavelength for the optical signal used for power supply and an optical signal for control, an expensive optical multiplexer and optical demultiplexer used to separate the wavelengths for power supply and for control are unnecessary. As a result, the construction cost of the optical power supply system can be reduced.

CITATION LIST

Patent Literature

Patent Literature 1: JP 2010-193374 A

SUMMARY OF INVENTION

Technical Problem

In an ONU to which power is supplied by power supply as described above, some functions are put into a sleep state when not in use in order to curb consumption of the supplied power. In the configuration disclosed in Patent Literature 1, the operation is controlled by periodically generating an operation trigger using a timer. In order to receive downlink data in an ONU in a sleep state, at least sleep of a reception unit needs to be canceled at the timing when the downlink data comes. In a configuration in which sleep is periodically canceled, time synchronization is required between the OLT and the ONU, and there is a problem that wasteful activation and standby power are generated.

In view of the above circumstances, an object of the present invention is to provide a technique that can easily reduce power consumption in a system that performs optical power supply.

Solution to Problem

One aspect of the present invention is an optical power supply system including a power supply side optical communication device that supplies power using an optical signal for power supply, and a power receiving side optical communication device that is driven by power obtained from the optical signal for power supply transmitted from the power supply side optical communication device, in which: the power supply side optical communication device includes a sleep control unit that generates a sleep cancellation signal for canceling sleep states of some functional units included in the power receiving side optical communication device, and a power supply control unit that superimposes the sleep cancellation signal on the optical signal for power supply and transmits the superimposed signal to the power receiving side optical communication device; and the power receiving side optical communication device includes a detection unit that detects the sleep cancellation signal superimposed on the optical signal for power supply, and a control unit that performs control to switch a functional unit from a sleep state to an activated state in response to the sleep cancellation signal detected by the detection unit.

One aspect of the present invention is a sleep cancellation method performed by an optical power supply system including a power supply side optical communication device that supplies power using an optical signal for power supply, and a power receiving side optical communication device that is driven by power obtained from the optical signal for power supply transmitted from the power supply side optical communication device, the sleep cancellation method including the steps of: the power supply side optical communication device generating a sleep cancellation signal for canceling sleep states of some functional units included in the power receiving side optical communication device, and superimposing the sleep cancellation signal on the optical signal for power supply and transmitting the superimposed signal to the power receiving side optical communication device; and the power receiving side optical communication device detecting the sleep cancellation signal superimposed on the optical signal for power supply, and performing control to switch a functional unit from a sleep state to an activated state in response to the detected sleep cancellation signal.

One aspect of the present invention is a power receiving side optical communication device in an optical power supply system including a power supply side optical communication device that supplies power using an optical signal for power supply, and the power receiving side optical communication device that is driven by power obtained from the optical signal for power supply transmitted from the power supply side optical communication device, the power receiving side optical communication device including a detection unit that detects a sleep cancellation signal for canceling sleep states of some functional units included in the power receiving side optical communication device superimposed on the optical signal for power supply, and a control unit that switches a functional unit from a sleep state to an activated state in response to the sleep cancellation signal detected by the detection unit.

Advantageous Effects of Invention

According to the present invention, it is possible to easily reduce power consumption in a system that performs optical power supply.

DESCRIPTION OF EMBODIMENTS

Hereinafter, an embodiment of the present invention will be described with reference to the drawings.

Outline

First, an outline of an optical power supply system 100 of the present invention will be described.

In an optical communication system that supplies power by optical power supply, an OLT superimposes a sleep cancellation signal on a feed light as necessary and transmits the superimposed signal before data transmission. An ONU charges on the basis of the feed light transmitted from the OLT. Further, the ONU monitors the state of charge of a power storage unit, and when detecting a sleep cancellation signal superimposed on a feed light when the power storage unit is sufficiently charged, the ONU activates a transmission unit or a reception unit in a sleep state. For example, when activating the transmission unit, the ONU transmits an acknowledgement (ACK) signal to the OLT. Thereafter, the ONU puts the transmission unit into a sleep state again, and activates the reception unit in a sleep state to receive data transmitted from the OLT.

With the above configuration, the reception unit and the transmission unit of the ONU can be activated when necessary, and power consumption can be reduced in the optical power supply system.

Hereinafter, a specific configuration will be described using a plurality of embodiments as examples.

First Embodiment

Figure 1:
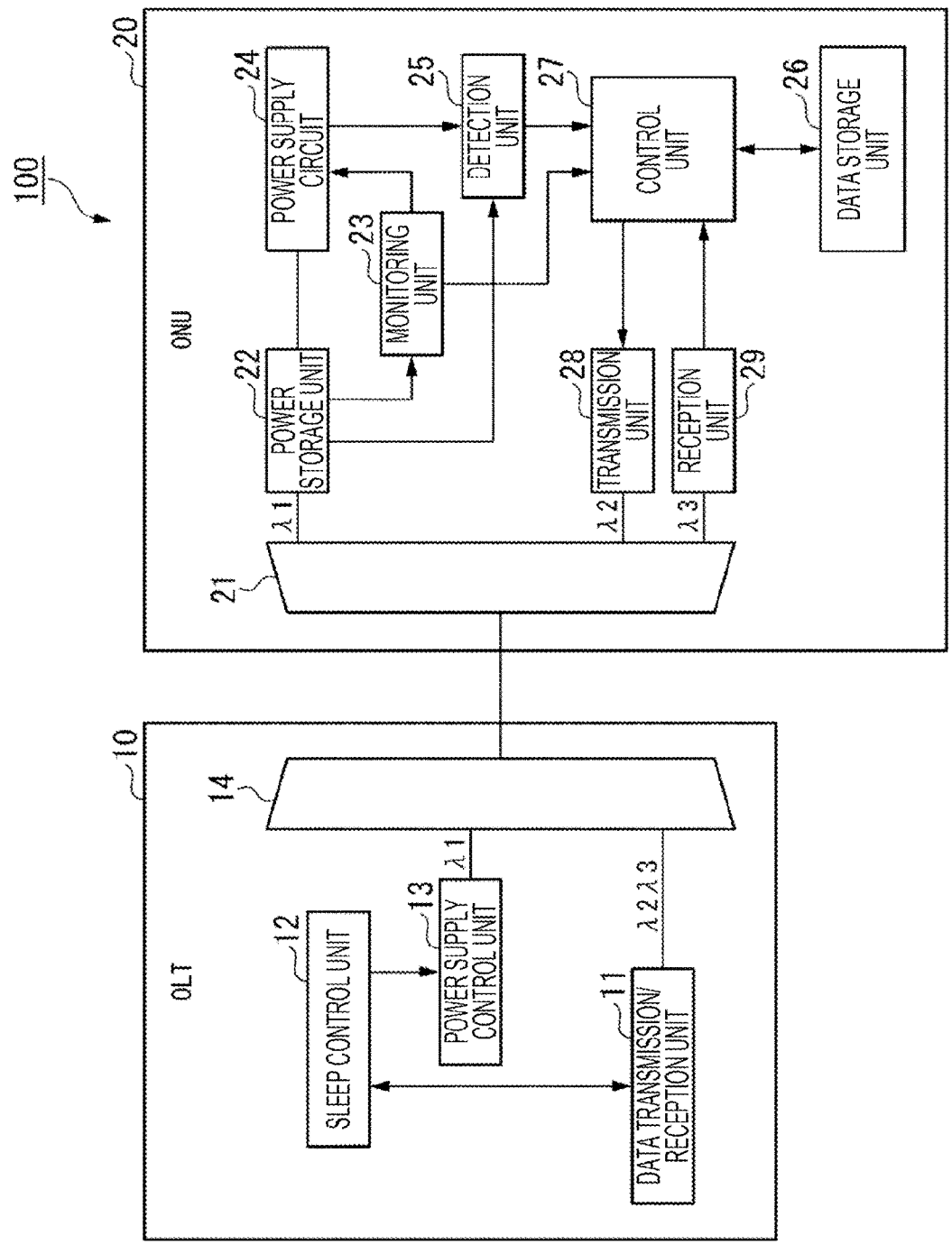
FIG. 1 is a diagram illustrating a configuration example of an optical power supply system in a first embodiment.

FIG. 1 is a diagram illustrating a configuration example of an optical power supply system 100 in a first embodiment.

The optical power supply system 100 includes an OLT 10 and an ONU 20. The OLT 10 and the ONU 20 are communicably connected via an optical fiber. While FIG. 1 illustrates one ONU 20, the optical power supply system 100 may include a plurality of ONUs 20. When the optical power supply system 100 includes a plurality of ONUs 20, an optical splitter is provided between the OLT 10 and the plurality of ONUs 20. The optical splitter branches the optical signal transmitted from the OLT 10 and transmits the optical signal to each ONU 20. The optical splitter multiplexes optical signals transmitted from the ONUs 20 and transmits the multiplexed optical signal to the OLT 10. Hereinafter, a direction from the OLT 10 to the ONU 20 is referred to as a downlink direction, and a direction from the ONU 20 to the OLT 10 is referred to as an uplink direction.

The OLT 10 uses different wavelengths for the feed light and an optical signal for a communication service. For example, the OLT 10 uses a wavelength $\lambda 1$ for the feed light, and wavelengths $\lambda 2$ and $\lambda 3$ for optical signals for communication services. In the following description, in the OLT 10, the wavelength $\lambda 2$ is used as a reception wavelength, and the wavelength $\lambda 3$ is used as a transmission wavelength. In this case, in the ONU 20, the wavelength $\lambda 2$ is used as a transmission wavelength, and the wavelength $\lambda 3$ is used as a reception wavelength.

The OLT 10 includes a data transmission/reception unit 11, a sleep control unit 12, a power supply control unit 13, and a multiplexer/demultiplexer 14.

The data transmission/reception unit 11 transmits and receives data to and from the ONU 20. The data transmission/reception unit 11 is, for example, an optical transceiver, and includes a light source that emits light having the wavelength $\lambda 3$ for data transmission. The data transmission/reception unit 11 modulates light emitted from the light source provided therein on the basis of an electrical signal of data to convert the light into an optical signal of the data, and sends the converted optical signal of the data to an optical fiber. The data transmission/reception unit 11 includes therein, for example, an optical/electrical (O/E) converter such as a photodetection unit. The data transmission/reception unit 11 receives an optical signal of data received via the optical fiber, converts the received optical signal of the data into an electrical signal by the O/E converter, and outputs the electrical signal to the sleep control unit 12.

The sleep control unit 12 controls sleep states of functional units included in the ONU 20. Specifically, when there is data to be transmitted to the ONU 20, the sleep control unit 12 generates a sleep cancellation signal for activating functional units included in the ONU 20, and outputs the generated sleep cancellation signal to the power supply control unit 13.

The power supply control unit 13 includes therein a light source that emits light having the wavelength $\lambda 1$ for power supply. The power supply control unit 13 generates a feed light by the light source, and sends the generated feed light to the optical fiber via the multiplexer/demultiplexer 14. When a sleep cancellation signal is obtained from the sleep control unit 12, the power supply control unit 13 superimposes the sleep cancellation signal on the feed light and transmits the superimposed signal to the multiplexer/demultiplexer 14.

The multiplexer/demultiplexer 14 multiplexes the optical signal output from the data transmission/reception unit 11 and the optical signal output from the power supply control unit 13 and outputs the multiplexed signal to the optical fiber. The multiplexer/demultiplexer 14 demultiplexes an optical signal input via the optical fiber to the data transmission/reception unit 11.

The ONU 20 is driven by power supplied from the OLT 10. The ONU 20 includes a multiplexer/demultiplexer 21, a power storage unit 22, a monitoring unit 23, a power supply circuit 24, a detection unit 25, a data storage unit 26, a control unit 27, a transmission unit 28, and a reception unit 29.

The multiplexer/demultiplexer 21 demultiplexes an optical signal input via the optical fiber to the power storage unit 22 and the reception unit 29. For example, the multiplexer/demultiplexer 21 outputs an optical signal having the wavelength $\lambda 1$ to the power storage unit 22, and outputs an optical signal having the wavelength 23 to the reception unit 29. The multiplexer/demultiplexer 21 outputs an optical signal output from the transmission unit 28 to the optical fiber.

The power storage unit 22 includes therein an O/E converter and a battery. The power storage unit 22 receives a feed light received via the optical fiber, and converts the received feed light into an electric signal. The power storage unit 22 stores electric power of the electric signal in a battery by performing charge processing on the basis of the electric signal.

The monitoring unit 23 monitors the charge amount of the battery included in the power storage unit 22. For example, the monitoring unit 23 monitors the charge amount of the battery at predetermined intervals. The monitoring unit 23 operates the power supply circuit 24 to generate a power supply voltage in a case where the charge amount of the battery is equal to or more than a predetermined activation threshold. The activation threshold is desirably set to a value indicating that the battery included in power storage unit 22 is sufficiently charged. For example, the activation threshold is a value of 80% or more of the total capacity of the battery.

The power supply circuit 24 supplies a power supply voltage generated using the power charged in the power storage unit 22 to the detection unit 25, the data storage unit 26, and the control unit 27. As a result, the detection unit 25, the data storage unit 26, and the control unit 27 become operable from the sleep state.

While the power supply voltage is supplied from the power supply circuit 24, the detection unit 25 detects a sleep cancellation signal superimposed on the electric signal for power supply converted by the power storage unit 22. When detecting a sleep cancellation signal, the detection unit 25 outputs the sleep cancellation signal to the control unit 27.

The data storage unit 26 stores uplink data for a communication service and downlink data for a communication service. Here, uplink data is data obtained from an external device connected below the ONU 20 and transmitted in the uplink direction, and downlink data is data received by the reception unit 29 and transmitted in the downlink direction. The data storage unit 26 may be configured using a storage device such as a magnetic storage device or a semiconductor storage device, or may be a non-transitory recording medium.

The control unit 27 performs data transmission/reception control and sleep control. In the first embodiment, the control unit 27 cancels a sleep state of the reception unit 29 when a sleep cancellation signal is detected. Further, the control unit 27 monitors the accumulation amount of uplink data accumulated in the data storage unit 26.

The transmission unit 28 includes therein a light source that emits light having the wavelength 22 for data transmission. The transmission unit 28 modulates light emitted from the light source provided therein on the basis of an electrical signal of uplink data to convert the light into an optical signal of the uplink data, and sends the converted optical signal of the uplink data to the optical fiber. The transmission unit 28 is in a sleep state when not transmitting data, and is activated under the control of the control unit 27.

The reception unit 29 includes therein an O/E converter such as a photodetector. The reception unit 29 receives an optical signal of downlink data received via the optical fiber, converts the received optical signal of the downlink data into an electrical signal by the O/E converter, and outputs the electrical signal to the control unit 27. The reception unit 29 is in a sleep state when not receiving data, and is activated under the control of the control unit 27.

Figure 2:
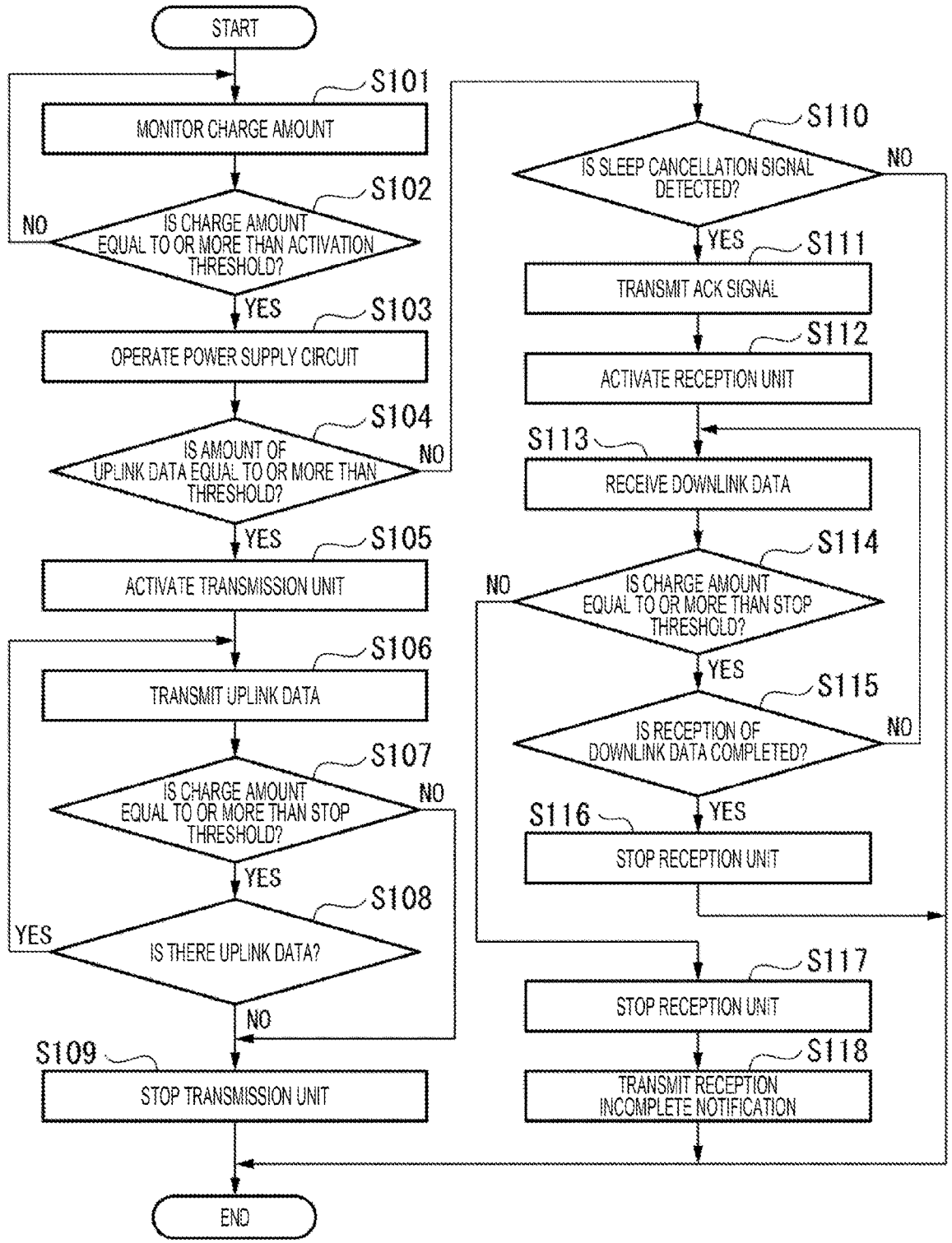
FIG. 2 is a flowchart illustrating a flow of processing of an ONU in the first embodiment.

FIG. 2 is a flowchart illustrating a flow of processing of the ONU 20 in the first embodiment. Note that at the start of the processing in FIG. 2, the detection unit 25, the data storage unit 26, the control unit 27, the transmission unit 28, and the reception unit 29 are assumed to be in a sleep state. The processing of FIG. 2 is executed while power is supplied from the OLT 10 to the ONU 20.

The monitoring unit 23 monitors the charge amount of the battery included in the power storage unit 22 (step S101). The monitoring unit 23 compares the charge amount of the battery with the activation threshold, and determines whether or not the charge amount of the battery is equal to or more than the activation threshold (step S102). If the charge amount of the battery is less than the activation threshold (NO in step S102), the battery is not sufficiently charged. Therefore, the ONU 20 performs the processing of step S101 until the battery is sufficiently charged.

If the charge amount of the battery is equal to or more than the activation threshold (YES in step S102), the monitoring unit 23 operates the power supply circuit 24 to generate a power supply voltage (step S103). As a result, the power supply voltage is supplied from the power supply circuit 24 to each functional unit (e.g., detection unit 25, data storage unit 26, and control unit 27). The detection unit 25, the data storage unit 26, and the control unit 27 operate by the power supply voltage supplied from the power supply circuit 24.

The control unit 27 refers to uplink data stored in the data storage unit 26 and determines whether or not the amount of uplink data is equal to or more than a threshold (step S104). Note that immediately after activation, it is also assumed that little uplink data is accumulated in the data storage unit 26. Therefore, the control unit 27 may refer to uplink data stored in the data storage unit 26 and determine whether or not the amount of uplink data is equal to or more than a threshold after passage of a predetermined period.

If the amount of uplink data is equal to or more than the threshold (YES in step S104), the control unit 27 activates the transmission unit 28 (step S105).

Specifically, the control unit 27 supplies power to the transmission unit 28 that is in a sleep state, thereby switching the transmission unit 28 from the sleep state to an activated state. The control unit 27 outputs the uplink data stored in the data storage unit 26 to the transmission unit 28. For example, the control unit 27 outputs an amount of uplink data that can be transmitted at a time by the transmission unit 28 to the transmission unit 28.

The transmission unit 28 generates an optical signal of uplink data by using the uplink data output from the control unit 27, and sends the generated optical signal of the uplink data to the optical fiber (step S106). The monitoring unit 23 continues to monitor the charge amount of the battery included in the power storage unit 22 in and after the processing of step S103. The monitoring unit 23 compares the charge amount of the battery with a stop threshold, and determines whether or not the charge amount of the battery is equal to or more than the stop threshold (step S107). Here, a stop threshold is a value serving as a reference for stopping transmission and reception of data. The stop threshold is desirably set to a value indicating that the charge amount of the battery included in the power storage unit 22 is very small. For example, the stop threshold is a value of 20% of the total capacity of the battery. When the charge amount of the battery is less than the stop threshold, the remaining battery life may run out during transmission or reception of data, which may affect the transmission or reception of data. Therefore, such a threshold is provided.

If the charge amount of the battery is equal to or more than the stop threshold (YES in step S107), the monitoring unit 23 outputs a notification indicating that the charge amount of the battery is equal to or more than the stop threshold to the control unit 27. When receiving the notification that the charge amount of the battery is equal to or more than the stop threshold, the control unit 27 refers to uplink data stored in the data storage unit 26 and determines whether or not there is more uplink data (step S108). If there is uplink data (YES in step S108), the ONU 20 performs the processing in step S106.

On the other hand, if there is no uplink data (NO in step S108), the control unit 27 stops the transmission unit 28 (step S109). Specifically, the control unit 27 stops power supply to the transmission unit 28 in the activated state, thereby switching the transmission unit 28 from the activated state to a sleep state. Thereafter, the ONU 20 ends the processing of FIG. 2. Note that when power is being supplied from the OLT 10, the ONU 20 may return to the processing of step S101 and perform the processing of FIG. 2.

In the processing of step S107, if the charge amount of the battery is less than the stop threshold (NO in step S107), the monitoring unit 23 outputs a notification indicating that the charge amount of the battery is less than the stop threshold to the control unit 27. When receiving the notification that the charge amount of the battery is less than the stop threshold, the control unit 27 stops the transmission unit 28 (step S109).

In the processing of step S104, if the amount of uplink data is less than the threshold (NO in step S104), the detection unit 25 determines whether or not a sleep cancellation signal is detected (step S110). If a sleep cancellation signal is superimposed on the electric signal for power supply converted by the power storage unit 22, the detection unit 25 determines that the sleep cancellation signal has been detected. If the sleep cancellation signal is not superimposed on the electric signal for power supply converted by the power storage unit 22, the detection unit 25 determines that the sleep cancellation signal is not detected.

If the detection unit 25 determines that the sleep cancellation signal is not detected (NO in step S110), the ONU 20 ends the processing of FIG. 2. Note that when power is being supplied from the OLT 10, the ONU 20 may return to the processing of step S101 and perform the processing of FIG. 2.

If the detection unit 25 determines that a sleep cancellation signal is detected (YES in step S110), the detection unit 25 outputs the sleep cancellation signal to the control unit 27. When receiving the sleep cancellation signal from the detection unit 25, the control unit 27 transmits an ACK signal to the OLT 10 (step S111). For example, the control unit 27 temporarily activates the transmission unit 28 and transmits the ACK signal to the OLT 10. In a case where the transmission unit 28 is temporarily activated, the control unit 27 puts the transmission unit 28 into a sleep state after transmitting the ACK signal.

Thereafter, the control unit 27 activates the reception unit 29 (step S112). Specifically, the control unit 27 supplies power to the reception unit 29 that is in a sleep state, thereby switching the reception unit 29 from the sleep state to an activated state. The reception unit 29 receives downlink data output via the multiplexer/demultiplexer 21. The reception unit 29 outputs the received downlink data to the control unit 27. The control unit 27 stores the downlink data output from the reception unit 29 in the data storage unit 26.

The monitoring unit 23 continues to monitor the charge amount of the battery included in the power storage unit 22 in and after the processing of step S103. The monitoring unit 23 compares the charge amount of the battery with the stop threshold, and determines whether or not the charge amount of the battery is equal to or more than the stop threshold (step S114). If the charge amount of the battery is equal to or more than the stop threshold (YES in step S114), the monitoring unit 23 outputs a notification indicating that the charge amount of the battery is equal to or more than the stop threshold to the control unit 27. When receiving the notification that the charge amount of the battery is equal to or more than the stop threshold, the control unit 27 determines whether or not reception of downlink data is completed (step S115). If reception of downlink data is not completed (NO in step S115), the ONU 20 performs the processing in step S113.

On the other hand, if reception of downlink data is completed (YES in step S115), the control unit 27 stops the reception unit 29 (step S116). Specifically, the control unit 27 stops power supply to the reception unit 29 in the activated state, thereby switching the reception unit 29 from the activated state to a sleep state. Thereafter, the ONU 20 ends the processing of FIG. 2. Note that when power is being supplied from the OLT 10, the ONU 20 may return to the processing of step S101 and perform the processing of FIG. 2.

In the processing of step S114, if the charge amount of the battery is less than the stop threshold (NO in step S114), the monitoring unit 23 outputs a notification indicating that the charge amount of the battery is less than the stop threshold to the control unit 27. When receiving the notification that the charge amount of the battery is less than the stop threshold, the control unit 27 stops the reception unit 29 (step S117). In this case, there is a case where reception of all downlink data transmitted from the OLT 10 is not completed.

Therefore, the control unit 27 transmits a reception incomplete notification to the OLT 10 (step S118). For example, the control unit 27 temporarily activates the transmission unit 28 and transmits a reception incomplete notification to the OLT 10. In the case where the transmission unit 28 is temporarily activated, the control unit 27 puts the transmission unit 28 into a sleep state after transmitting the reception incomplete notification. A reception incomplete notification is a notification indicating that reception of all downlink data transmitted from the OLT 10 is not completed. Note that the reception incomplete notification may include information indicating how far the downlink data reception has progressed. As a result, the OLT 10 can start transmission from downlink data that has not been received by the ONU 20 at the time of next downlink data transmission. The ONU 20 ends the processing of FIG. 2. Note that when power is being supplied from the OLT 10, the ONU 20 may return to the processing of step S101 and perform the processing of FIG. 2.

According to the optical power supply system 100 configured as described above, the ONU 20 cancels a sleep state of the reception unit 29 in response to a sleep cancellation signal included in a feed light transmitted from the OLT 10. In the first embodiment, the sleep cancellation signal is transmitted to the ONU 20 when the OLT 10 transmits downlink data. Therefore, the ONU 20 can start the reception unit 29 at a timing necessary for receiving downlink data. As a result, the reception unit 29 is not activated at an unnecessary timing. Further, it is only necessary to superimpose a sleep cancellation signal on an optical signal originally used by the OLT 10 for power supply. Therefore, it is possible to easily reduce power consumption in a system that performs optical power supply.

In the ONU 20, power consumption can be reduced without simultaneously activating the transmission unit 28 and the reception unit 29.

When the charge amount is insufficient in the ONU 20, operation of the detection unit 25 is stopped. Therefore, it is possible to automatically determine whether or not detection of a sleep cancellation signal is possible, which facilitates control.

Second Embodiment

The first embodiment describes a configuration in which a sleep cancellation signal is used to cancel sleep of the reception unit of the ONU. A second embodiment describes a configuration in which a sleep cancellation signal is used to cancel sleep of both a transmission unit and a reception unit of an ONU. Note that the second embodiment is an embodiment in which transmission of uplink data is prioritized over reception of downlink data.

Figure 3:
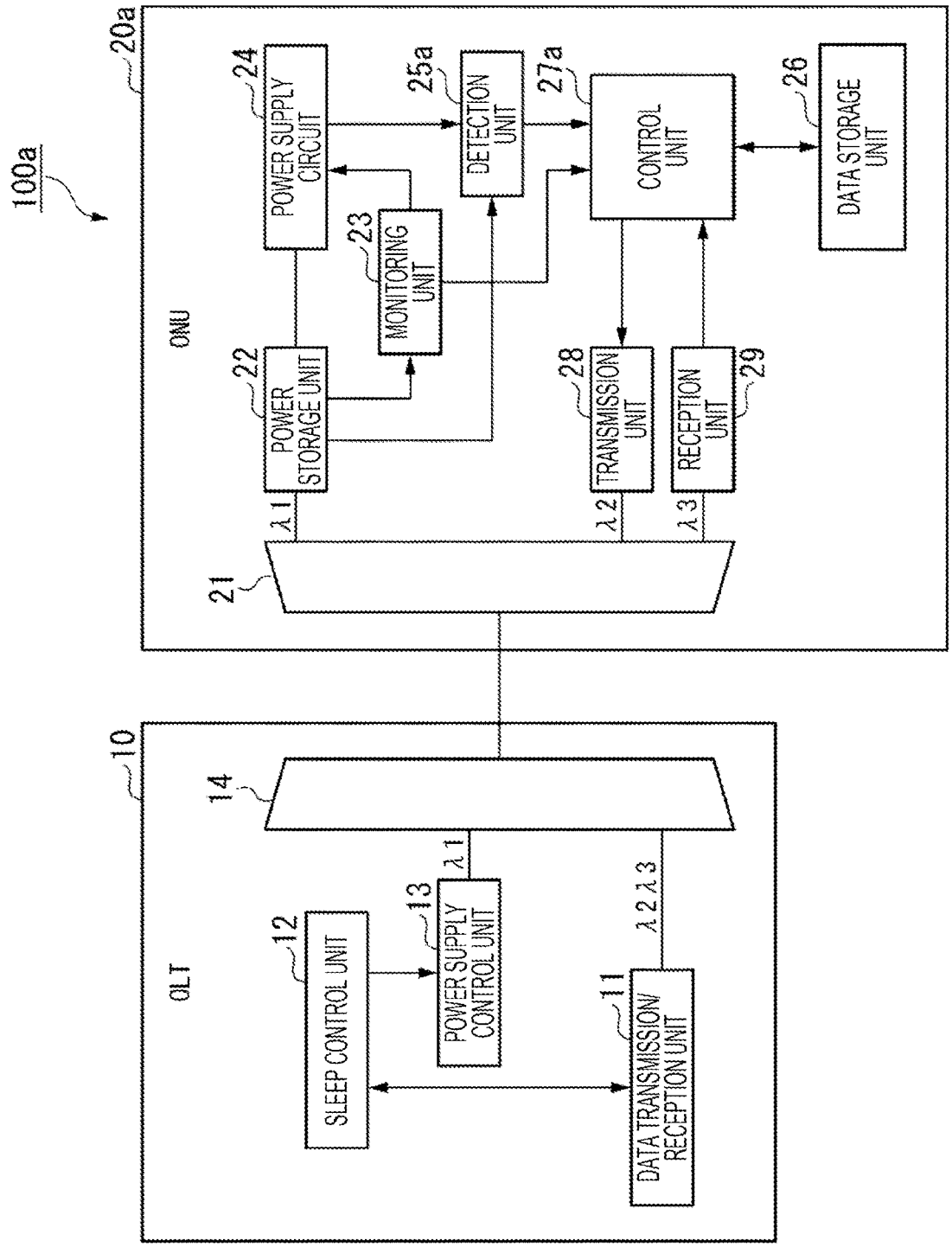
FIG. 3 is a diagram illustrating a configuration example of an optical power supply system in a second embodiment.

FIG. 3 is a diagram illustrating a configuration example of an optical power supply system 100a in the second embodiment.

The optical power supply system 100a includes an OLT 10 and an ONU 20a. The OLT 10 and the ONU 20a are communicably connected via an optical fiber. While FIG. 3 illustrates one ONU 20a, the optical power supply system 100a may include a plurality of ONUs 20a. Hereinafter, differences from the first embodiment will be described.

The ONU 20a is driven by power supplied from the OLT 10. The ONU 20a includes a multiplexer/demultiplexer 21, a power storage unit 22, a monitoring unit 23, a power supply circuit 24, a detection unit 25, a data storage unit 26, a control unit 27a, a transmission unit 28, and a reception unit 29.

The ONU 20a is different from the ONU 20 in including the control unit 27a instead of the control unit 27. The ONU 20a is similar to the ONU 20 in other configurations. Therefore, overall description of the ONU 20a will be omitted, and the control unit 27a will be described.

The control unit 27a performs data transmission/reception control and sleep control. In the second embodiment, the control unit 27a cancels sleep states of the transmission unit 28 and the reception unit 29 when a sleep cancellation signal is detected. At this time, when there is uplink data equal to or more than a threshold, the control unit 27a preferentially activates the transmission unit 28, so that transmission of uplink data is prioritized over reception of downlink data. Further, the control unit 27a monitors the accumulation amount of uplink data accumulated in the data storage unit 26.

Figure 4:
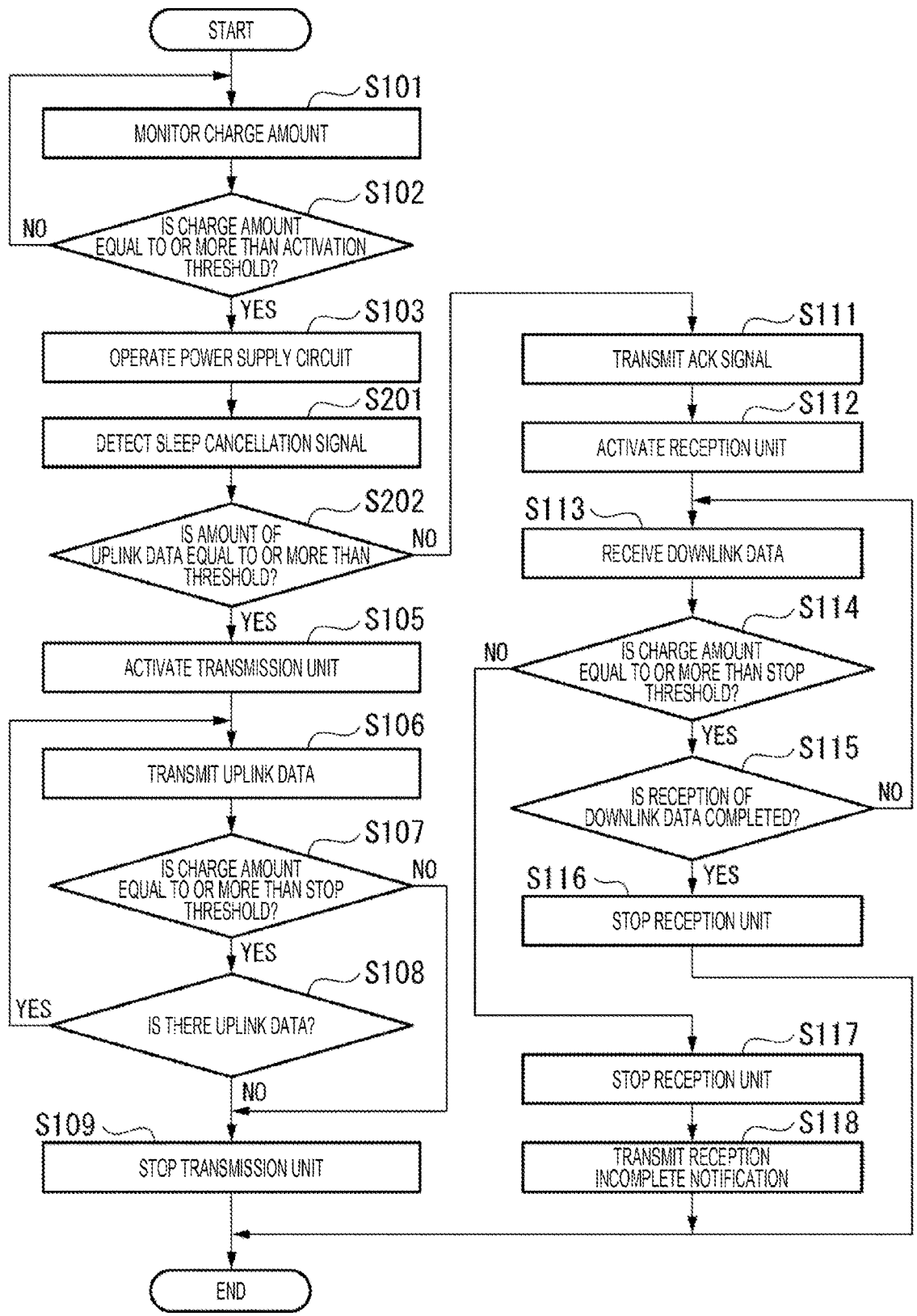
FIG. 4 is a flowchart illustrating a flow of processing of an ONU in the second embodiment.

FIG. 4 is a flowchart illustrating a flow of processing of the ONU 20a in the second embodiment. Note that at the start of the processing in FIG. 4, the detection unit 25, the data storage unit 26, the control unit 27a, the transmission unit 28, and the reception unit 29 are assumed to be in a sleep state. The processing of FIG. 4 is executed while power is supplied from the OLT 10 to the ONU 20a. In FIG. 4, the same processing steps as those in FIG. 2 are denoted by the same reference numerals as those used in FIG. 2, and description thereof is omitted.

In the processing of step S103, the detection unit 25, the data storage unit 26, and the control unit 27a operate by the power supply voltage supplied from the power supply circuit 24. The detection unit 25 detects a sleep cancellation signal superimposed on the electric signal for power supply converted by the power storage unit 22 (step S201). Note that while the description herein will be given on the assumption that the sleep cancellation signal is superimposed on the electric signal for power supply, when the sleep cancellation signal is not superimposed on the electric signal for power supply, the ONU 20a ends the processing of FIG. 4. Note that when power is being supplied from the OLT 10, the ONU 20a may return to the processing of step S101 and perform the processing of FIG. 4.

The detection unit 25 outputs the detected sleep cancellation signal to the control unit 27a. When receiving the sleep cancellation signal from the detection unit 25, the control unit 27a refers to uplink data stored in the data storage unit 26 and determines whether or not the amount of uplink data is equal to or more than a threshold (step S202). If the amount of uplink data is equal to or more than the threshold (YES in step S202), the ONU 20a executes the processing from step S105 to step S109.

On the other hand, if the amount of uplink data is less than the threshold (NO in step S202), the ONU 20a executes the processing in and after step S111.

According to the optical power supply system 100a of the second embodiment configured as described above, the ONU 20a performs the uplink data transmission processing or the downlink data reception processing by switching one of the transmission unit 28 and the reception unit 29 to the activated state when necessary. As a result, neither the transmission unit 28 nor the reception unit 29 is activated when it is not necessary. Therefore, it is possible to reduce power consumption in the optical power supply system.

Further, in the second embodiment, downlink data is received when there is no accumulation of uplink data when the ONU 20a detects a sleep cancellation signal. That is, when the ONU 20a detects a sleep cancellation signal and uplink data is accumulated to some extent, transmission of uplink data is prioritized regardless of the presence or absence of downlink data. As described above, the ONU 20a can prioritize transmission of uplink data over reception of downlink data, and the ONU 20a can determine the sleep cancellation target.

Third Embodiment

In the second embodiment, the embodiment in which transmission of uplink data is prioritized over reception of downlink data has been described. A third embodiment describes an embodiment in which reception of downlink data is prioritized over transmission of uplink data. The basic configuration is similar to that of the second embodiment. The difference from the second embodiment is the operation performed by a control unit 27a.

The control unit 27a performs data transmission/reception control and sleep control. In the third embodiment, the control unit 27a cancels sleep states of a transmission unit 28 and a reception unit 29 when a sleep cancellation signal is detected. At this time, the control unit 27a preferentially activates the reception unit 29 regardless of the presence or absence of uplink data, so that reception of downlink data is prioritized over transmission of uplink data. Further, the control unit 27a monitors the accumulation amount of uplink data accumulated in the data storage unit 26.

Figure 5:
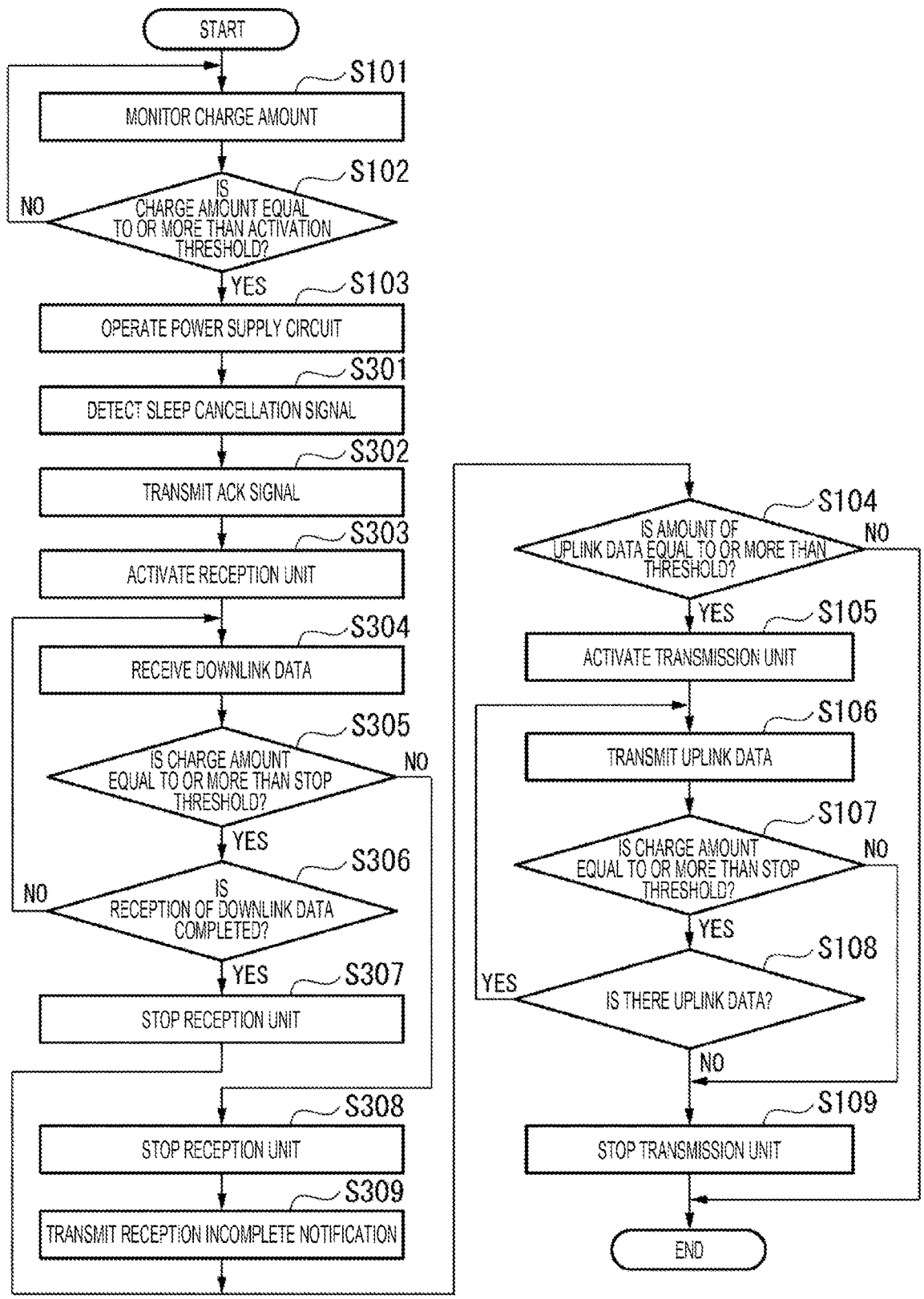
FIG. 5 is a flowchart illustrating a flow of processing of an ONU in the third embodiment.

FIG. 5 is a flowchart illustrating a flow of processing of an ONU 20a in the third embodiment. Note that at the start of the processing in FIG. 5, a detection unit 25, the data storage unit 26, the control unit 27a, the transmission unit 28, and the reception unit 29 are assumed to be in a sleep state. The processing of FIG. 5 is executed while power is supplied from an OLT 10 to the ONU 20a. In FIG. 5, the same processing steps as those in FIG. 2 are denoted by the same reference numerals as those used in FIG. 2, and description thereof is omitted.

In the processing of step S103, the detection unit 25, the data storage unit 26, and the control unit 27a operate by the power supply voltage supplied from the power supply circuit 24. The detection unit 25 detects a sleep cancellation signal superimposed on the electric signal for power supply converted by a power storage unit 22 (step S301). Note that while the description herein will be given on the assumption that the sleep cancellation signal is superimposed on the electric signal for power supply, when the sleep cancellation signal is not superimposed on the electric signal for power supply, the ONU 20a ends the processing of FIG. 5. Note that when power is being supplied from the OLT 10, the ONU 20a may return to the processing of step S101 and perform the processing of FIG. 5.

The detection unit 25 outputs the detected sleep cancellation signal to the control unit 27a. When receiving the sleep cancellation signal from the detection unit 25, the control unit 27a transmits an ACK signal to the OLT 10 (step S302). Thereafter, the control unit 27 activates the reception unit 29 (step S303). Specifically, the control unit 27 supplies power to the reception unit 29 that is in a sleep state, thereby switching the reception unit 29 from the sleep state to an activated state. The reception unit 29 receives downlink data output via the multiplexer/demultiplexer 21. The reception unit 29 outputs the received downlink data to the control unit 27. The control unit 27 stores the downlink data output from the reception unit 29 in the data storage unit 26.

The monitoring unit 23 continues to monitor the charge amount of the battery included in the power storage unit 22 in and after the processing of step S103. The monitoring unit 23 compares the charge amount of a battery with a stop threshold, and determines whether or not the charge amount of the battery is equal to or more than the stop threshold (step S305). If the charge amount of the battery is equal to or more than the stop threshold (YES in step S305), the monitoring unit 23 outputs a notification indicating that the charge amount of the battery is equal to or more than the stop threshold to the control unit 27. When receiving the notification that the charge amount of the battery is equal to or more than the stop threshold, the control unit 27 determines whether or not reception of downlink data is completed (step S306). If reception of downlink data is not completed (NO in step S306), the ONU 20 performs the processing in step S304.

On the other hand, if the ONU 20a is completed (YES in step S306), the control unit 27 stops the reception unit 29 (step S307). Thereafter, the ONU 20a executes the processing in and after step S105.

In the processing of step S305, if the charge amount of the battery is less than the stop threshold (NO in step S305), the monitoring unit 23 outputs a notification indicating that the charge amount of the battery is less than the stop threshold to the control unit 27a. When receiving the notification that the charge amount of the battery is less than the stop threshold, the control unit 27a stops the reception unit 29 (step S307). Then, the control unit 27a transmits a reception incomplete notification to the OLT 10 (step S308). Thereafter, the ONU 20a executes the processing in and after step S105.

In the third embodiment, the ONU 20a once activates the reception unit 29 and then performs uplink data transmission processing. As a result, reception of downlink data is prioritized over transmission of uplink data.

According to the optical power supply system 100a of the third embodiment configured as described above, the ONU 20a performs the uplink data transmission processing or the downlink data reception processing by switching one of the transmission unit 28 and the reception unit 29 to the activated state when necessary. As a result, neither the transmission unit 28 nor the reception unit 29 is activated when it is not necessary. Therefore, it is possible to reduce power consumption in the optical power supply system.

Further, in the third embodiment, downlink data is received regardless of the presence or absence of uplink data when the ONU 20a detects a sleep cancellation signal. That is, when the ONU 20a detects a sleep cancellation signal, even if uplink data is accumulated, reception of downlink data is prioritized over transmission of uplink data. As described above, the ONU 20a can prioritize reception of downlink data over transmission of uplink data, and the ONU 20a can determine the sleep cancellation target.

Fourth Embodiment

In the first to third embodiments, the configuration using one type of sleep cancellation signal has been described. In a fourth embodiment, a feed light in which any one or all of a plurality of types of sleep cancellation signals are superimposed in an OLT is transmitted to an ONU, and sleep cancellation of a functional unit corresponding to the sleep cancellation signal included in the feed light is controlled in the ONU.

Figure 6:
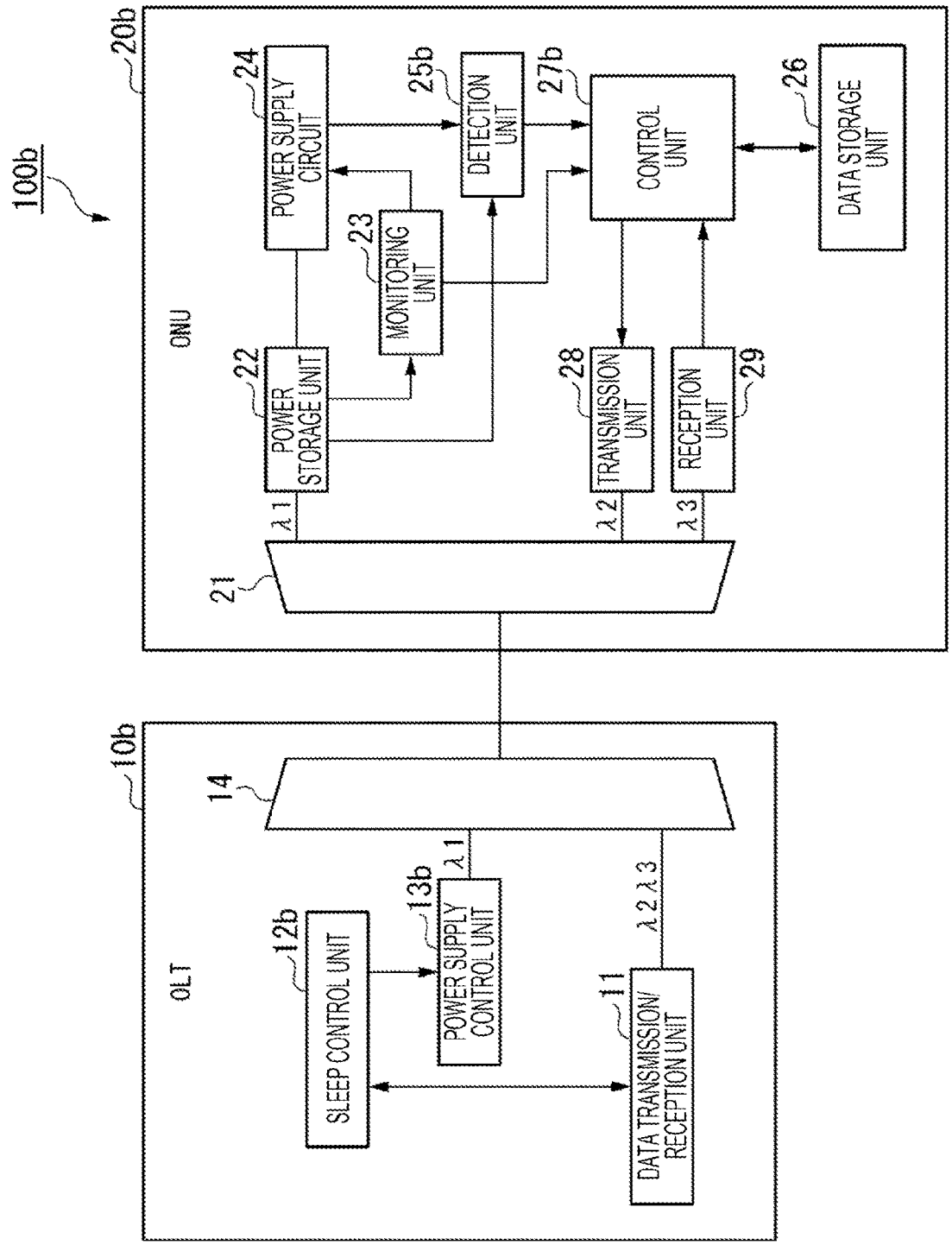
FIG. 6 is a diagram illustrating a configuration example of an optical power supply system in a fourth embodiment.

FIG. 6 is a diagram illustrating a configuration example of an optical power supply system 100b in the fourth embodiment.

The optical power supply system 100b includes an OLT 10b and an ONU 20b. The OLT 10b and the ONU 20b are communicably connected via an optical fiber. While FIG. 6 illustrates one ONU 20b, the optical power supply system 100b may include a plurality of ONUs 20b. Hereinafter, differences from the first to third embodiments will be described.

The OLT 10b includes a data transmission/reception unit 11, a sleep control unit 12b, a power supply control unit 13b, and a multiplexer/demultiplexer 14.

The OLT 10b is different from the OLT 10 in including the sleep control unit 12b and the power supply control unit 13b instead of the sleep control unit 12 and the power supply control unit 13. The OLT 10b is similar to the OLT 10 in other configurations. Therefore, overall description of the OLT 10b will be omitted, and the sleep control unit 12b and the power supply control unit 13b will be described.

The sleep control unit 12b controls sleep states of functional units included in the ONU 20b. Specifically, when there is data to be transmitted to the ONU 20b, the sleep control unit 12b generates a reception sleep cancellation signal for activating a reception unit 29 included in the ONU 20b, and outputs the generated reception sleep cancellation signal to the power supply control unit 13b. When it is necessary to receive uplink data from the ONU 20b, the sleep control unit 12b generates a transmission sleep cancellation signal for activating a transmission unit 28 included in the ONU 20b, and outputs the generated transmission sleep cancellation signal to the power supply control unit 13b. A case where it is necessary to receive uplink data from the ONU 20b is a case where information that requires a response of the ONU 20b is transmitted from the OLT 10b.

The power supply control unit 13b includes therein a light source that emits light having a wavelength $2l$ for power supply. The power supply control unit 13b generates a feed light by the light source, and sends the generated feed light to an optical fiber via the multiplexer/demultiplexer 14. When one or both of the transmission sleep cancellation signal and the reception sleep cancellation signal are obtained from the sleep control unit 12b, the power supply control unit 13b superimposes the obtained sleep cancellation signal on the feed light and transmits the superimposed signal to the multiplexer/demultiplexer 14.

The ONU 20b is driven by power supplied from the OLT 10b. The ONU 20b includes a multiplexer/demultiplexer 21, a power storage unit 22, a monitoring unit 23, a power supply circuit 24, a detection unit 25b, a data storage unit 26, a control unit 27b, a transmission unit 28, and a reception unit 29.

The ONU 20b is different from the ONU 20 in including a detection unit 25b and a control unit 27b instead of the detection unit 25 and the control unit 27. The ONU 20b is similar to the ONU 20 in other configurations. Therefore, overall description of the ONU 20b will be omitted, and the detection unit 25b and the control unit 27b will be described.

While the power supply voltage is supplied from the power supply circuit 24, the detection unit 25b detects a sleep cancellation signal superimposed on the electric signal for power supply converted by the power storage unit 22. Specifically, the detection unit 25b detects one or both of the transmission sleep cancellation signal and the reception sleep cancellation signal superimposed on the electric signal for power supply. When detecting one or both of the transmission sleep cancellation signal and the reception sleep cancellation signal, the detection unit 25 outputs the detected sleep cancellation signal to the control unit 27b.

The control unit 27b performs data transmission/reception control and sleep control. In the fourth embodiment, the control unit 27b cancels a sleep state of a target functional unit in response to a sleep cancellation signal detected by the detection unit 25b. For example, the control unit 27b cancels a sleep state of the transmission unit 28 when a transmission sleep cancellation signal is detected. For example, the control unit 27b cancels a sleep state of the reception unit 29 when a reception sleep cancellation signal is detected. Further, the control unit 27b monitors the accumulation amount of uplink data accumulated in the data storage unit 26.

Figure 7:
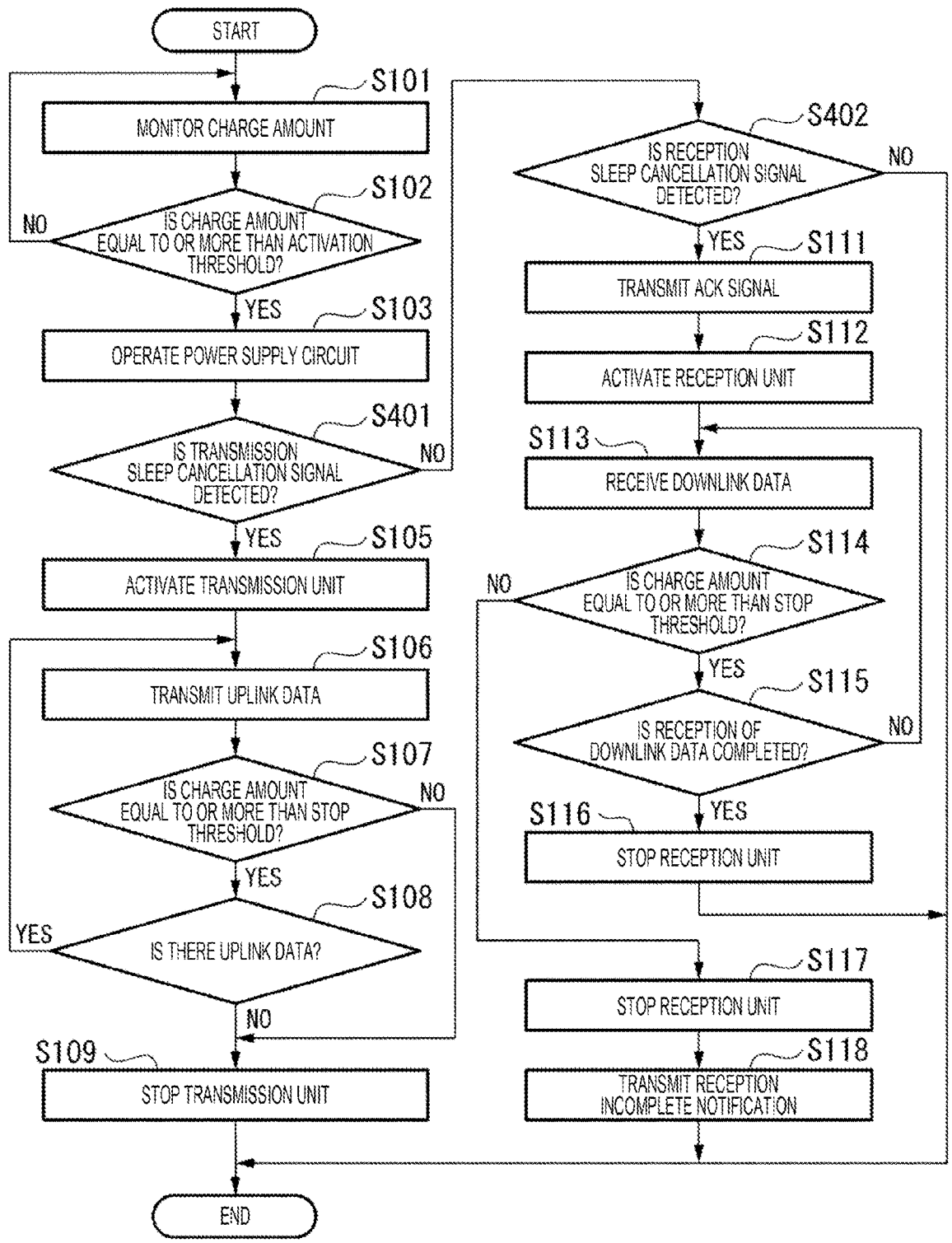
FIG. 7 is a flowchart illustrating a flow of processing of an ONU in the fourth embodiment.

FIG. 7 is a flowchart illustrating a flow of processing of the ONU 20b in the fourth embodiment. Note that at the start of the processing in FIG. 7, the detection unit 25b, the data storage unit 26, the control unit 27b, the transmission unit 28, and the reception unit 29 are assumed to be in a sleep state. The processing of FIG. 7 is executed while power is supplied from the OLT 10b to the ONU 20b. In FIG. 7, the same processing steps as those in FIG. 2 are denoted by the same reference numerals as those used in FIG. 2, and description thereof is omitted.

In the processing of step S103, the detection unit 25b, the data storage unit 26, and the control unit 27b operate by the power supply voltage supplied from the power supply circuit 24. The detection unit 25b determines whether or not a transmission sleep cancellation signal is detected (step S401). If a transmission sleep cancellation signal is superimposed on the electric signal for power supply converted by the power storage unit 22, the detection unit 25b determines that the transmission sleep cancellation signal has been detected. If the transmission sleep cancellation signal is not superimposed on the electric signal for power supply converted by the power storage unit 22, the detection unit 25b determines that the transmission sleep cancellation signal is not detected.

If the detection unit 25b determines that a transmission sleep cancellation signal is detected (YES in step S401), the ONU 20b executes the processing in and after step S105. As described above, when a transmission sleep cancellation signal is detected, the ONU 20b activates the transmission unit 28 to execute uplink data transmission processing.

If the detection unit 25b determines that the transmission sleep cancellation signal is not detected (NO in step S401), the detection unit 25b determines whether or not a reception sleep cancellation signal is detected (step S402).

If a reception sleep cancellation signal is superimposed on the electric signal for power supply converted by the power storage unit 22, the detection unit 25b determines that the reception sleep cancellation signal has been detected. If the reception sleep cancellation signal is not superimposed on the electric signal for power supply converted by the power storage unit 22, the detection unit 25b determines that the reception sleep cancellation signal is not detected.

If the detection unit 25b determines that a reception sleep cancellation signal is detected (YES in step S402), the ONU 20b executes the processing in and after step S111. As described above, when a reception sleep cancellation signal is detected, the ONU 20b activates the reception unit 29 to execute downlink data reception processing.

If the detection unit 25b determines that the reception sleep cancellation signal is not detected (No in step S402), the ONU 20b ends the processing of FIG. 7. Note that when power is being supplied from the OLT 10, the ONU 20b may return to the processing of step S101 and perform the processing of FIG. 7.

According to the optical power supply system 100b of the fourth embodiment configured as described above, the ONU 20b performs the uplink data transmission processing or the downlink data reception processing by switching one or both of the transmission unit 28 and the reception unit 29 to the activated state in response to an instruction from the OLT 10b. As a result, neither the transmission unit 28 nor the reception unit 29 is activated when it is not necessary. Therefore, it is possible to reduce power consumption in the optical power supply system.

Further, in the fourth embodiment, the ONU 20b activates the transmission unit 28 when detecting a transmission sleep cancellation signal, and activates the reception unit 29 when detecting a reception sleep cancellation signal. As described above, the ONU 20b can perform reception of downlink data and transmission of uplink data, as sleep cancellation targets, according to the determination of the ONU 20a.

Hereinafter, modifications unique to each of the above embodiments and modifications common to the first to fourth embodiments will be described.

In the first to fourth embodiments, the OLT 10, 10b may determine that the ONU 20, 20a, 20b has failed and issue an alarm when the ONU 20, 20a, 20b continues to fail to receive an ACK signal after transmission of a sleep cancellation signal a certain number of times under the condition that no uplink data is transmitted.

While the fourth embodiment describes the configuration in which the ONU 20b executes the processing of step S401 after the processing of step S103 in FIG. 7, the ONU 20b may be configured to execute the processing of step S402 after the processing of step S103 in FIG. 7. With such a configuration, if the detection unit 25b determines in the processing of step S402 that the reception sleep cancellation signal is not detected (NO in step S402), the detection unit 25b determines whether or not the transmission sleep cancellation signal is detected (step S401). If the processing of step S402 is "YES", the processing in and after step S111 is executed. If the processing of step S401 is "YES", the processing in and after step S105 is executed. If the processing of step S401 is "NO", the processing of FIG. 7 ends.

The optical power supply systems 100, 100a, and 100b in the first to fourth embodiments are not limited to a passive optical network (PON), and may be applied to any system as long as it is an optical communication system that performs optical power supply.

The monitoring unit 23, the detection units 25 and 25b, the control units 27, 27a, and 27b, and the data storage unit 26 of the ONUs 20, 20a, and 20b in the above-described embodiments may be implemented by a computer. In that case, a program for implementing these functions may be recorded in a computer-readable recording medium, and the program recorded in the recording medium may be read and executed by a computer system to implement the functions. Note that the "computer system" mentioned herein includes an OS and hardware such as peripheral devices. Also, the "computer-readable recording medium" refers to a portable medium such as a flexible disk, a magneto-optical disk, a ROM, or a CD-ROM, or a storage device such as a hard disk built in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for implementing some of the functions described above, may be formed with a combination of the functions described above and a program already recorded in a computer system, or may be formed with a programmable logic device such as a field programmable gate array (FPGA).

While the embodiments of the present invention have been described in detail with reference to the drawings, specific configurations are not limited to these embodiments, and include designs and the like without departing from the spirit of the present invention.

INDUSTRIAL APPLICABILITY

The present invention can be applied to an optical communication system that performs optical power supply.

REFERENCE SIGNS LIST 10, 10b OLT (Power supply side optical communication device)
20, 20a, 20b ONU (power receiving side optical communication device)
11 Data transmission/reception unit
12, 12b Sleep control unit
13, 13b Power supply control unit
14 Multiplexer/demultiplexer
21 Multiplexer/demultiplexer
22 Power storage unit
23 Monitoring unit
24 Power supply circuit
25, 25b Detection unit
26 Data storage unit
27, 27a, 27b Control unit
28 Transmission unit
29 Reception unit

The invention claimed is:

1. An optical power supply system comprising
a power supply side optical communication device configured to supply power using an optical signal for power supply, and
a power receiving side optical communication device that is driven by power obtained from the optical signal for power supply transmitted from the power supply side optical communication device, wherein:
the power supply side optical communication device includes
a sleep control unit, including one or more processors, configured to generate a sleep cancellation signal for canceling sleep states of some functional units included in the power receiving side optical communication device, and
a power supply control unit, including one or more processors, configured to superimpose the sleep cancellation signal on the optical signal for power supply and transmits the superimposed signal to the power receiving side optical communication device; and
the power receiving side optical communication device includes
a detection unit, including one or more processors, configured to detect the sleep cancellation signal superimposed on the optical signal for power supply, and
a control unit, including one or more processors, configured to perform control to switch a functional unit from a sleep state to an activated state in response to the sleep cancellation signal detected by the detection unit.

2. The optical power supply system according to claim 1, wherein
when the sleep cancellation signal is detected, after transmitting a response to reception of the sleep cancellation signal to the power supply side optical communication device, the control unit is configured to switch a reception unit configured to receive an optical signal for communication transmitted from the power supply side optical communication device from a sleep state to an operating state.

3. The optical power supply system according to claim 2, wherein
when an amount of accumulated uplink data is equal to or more than a first threshold, the control unit is configured to switch a transmission unit configured to transmit the uplink data from a sleep state to an operating state, and when the amount of accumulated uplink data is less than the first threshold, the control unit is configured to switch the reception unit from a sleep state to an operating state in response to the sleep cancellation signal.

4. The optical power supply system according to claim 2, wherein
when the sleep cancellation signal is detected and an amount of accumulated uplink data is equal to or more than a first threshold, the control unit is configured to switch a transmission unit that transmits the uplink data from a sleep state to an operating state, and when the sleep cancellation signal is detected and the amount of accumulated uplink data is less than the first threshold, the control unit is configured to switch the reception unit from a sleep state to an operating state in response to the sleep cancellation signal.

5. The optical power supply system according to claim 2, wherein
when the sleep cancellation signal is detected, the control unit is configured to perform reception processing by switching the reception unit from a sleep state to an operating state regardless of the amount of accumulated uplink data, and when the amount of accumulated uplink data is equal to or more than a first threshold after switching the reception unit from the operating state to the sleep state, the control unit is configured to switch a transmission unit that transmits the uplink data from a sleep state to an operating state.

6. The optical power supply system according to claim 1, wherein:
the sleep control unit is configured to generate a plurality of sleep cancellation signals as the sleep cancellation signal;
the power supply control unit is configured to superimpose any or all of the generated plurality of sleep cancellation signals on the optical signal for power supply and transmit the superimposed signal to the power receiving side optical communication device;
the detection unit is configured to detect the sleep cancellation signal superimposed on the optical signal for power supply; and
a functional unit designated by the sleep cancellation signal is controlled to be in an activated state in response to the sleep cancellation signal detected by the detection unit.

7. A sleep cancellation method performed by an optical power supply system including a power supply side optical communication device that supplies power using an optical signal for power supply, and a power receiving side optical communication device that is driven by power obtained from the optical signal for power supply transmitted from the power supply side optical communication device, the sleep cancellation method comprising the steps of:
by the power supply side optical communication device generating a sleep cancellation signal for canceling sleep states of some functional units included in the power receiving side optical communication device, and
superimposing the sleep cancellation signal on the optical signal for power supply and transmitting the superimposed signal to the power receiving side optical communication device; and
by the power receiving side optical communication device detecting the sleep cancellation signal superimposed on the optical signal for power supply, and
performing control to switch a functional unit from a sleep state to an activated state in response to the detected sleep cancellation signal.

8. The sleep cancellation method according to claim 7, further comprising, by the power receiving side optical communication device:
when the sleep cancellation signal is detected, after transmitting a response to reception of the sleep cancellation signal to the power supply side optical communication device, switching a reception unit configured to receive an optical signal for communication transmitted from the power supply side optical communication device from a sleep state to an operating state.

9. The sleep cancellation method according to claim 8, further comprising, by the power receiving side optical communication device:
when an amount of accumulated uplink data is equal to or more than a first threshold, switching a transmission unit that transmits the uplink data from a sleep state to an operating state, and when the amount of accumulated uplink data is less than the first threshold, switching the reception unit from a sleep state to an operating state in response to the sleep cancellation signal.

10. The sleep cancellation method according to claim 8, further comprising, by the power receiving side optical communication device:
when the sleep cancellation signal is detected and an amount of accumulated uplink data is equal to or more than a first threshold, switching a transmission unit configured to transmit the uplink data from a sleep state to an operating state, and when the sleep cancellation signal is detected and the amount of accumulated uplink data is less than the first threshold, switching the reception unit from a sleep state to an operating state in response to the sleep cancellation signal.

11. The sleep cancellation method according to claim 8, further comprising, by the power receiving side optical communication device:
when the sleep cancellation signal is detected, performing reception processing by switching a reception unit from a sleep state to an operating state regardless of the amount of accumulated uplink data, and when the amount of accumulated uplink data is equal to or more than a first threshold after switching the reception unit from the operating state to the sleep state, switching a transmission unit configured to transmit the uplink data from a sleep state to an operating state.

12. The sleep cancellation method according to claim 7, further comprising:
by the power supply side optical communication device
generating a plurality of sleep cancellation signals as the sleep cancellation signal;
superimposing any or all of the generated plurality of sleep cancellation signals on the optical signal for power supply and transmits the superimposed signal to the power receiving side optical communication device; and
by the power receiving side optical communication device:
detecting the sleep cancellation signal superimposed on the optical signal for power supply;
wherein a functional unit designated by the sleep cancellation signal is controlled to be in an activated state in response to the sleep cancellation signal being detected.

13. A power receiving side optical communication device in an optical power supply system including a power supply side optical communication device that supplies power using an optical signal for power supply, and the power receiving side optical communication device that is driven by power obtained from the optical signal for power supply transmitted from the power supply side optical communication device, the power receiving side optical communication device comprising
a detection unit, including one or more processors, configured to detect a sleep cancellation signal superimposed on the optical signal for power supply, and
a control unit, including one or more processors, configured to perform control to switch a functional unit from a sleep state to an activated state in response to the sleep cancellation signal detected by the detection unit.

14. The power receiving side optical communication device according to claim 13, wherein
when the sleep cancellation signal is detected, after transmitting a response to reception of the sleep cancellation signal to the power supply side optical communication device, the control unit is configured to switch a reception unit configured to receive an optical signal for communication transmitted from the power supply side optical communication device from a sleep state to an operating state.

15. The power receiving side optical communication device according to claim 14, wherein
when an amount of accumulated uplink data is equal to or more than a first threshold, the control unit is configured to switch a transmission unit that transmits the uplink data from a sleep state to an operating state, and when the amount of accumulated uplink data is less than the first threshold, the control unit is configured to switch the reception unit from a sleep state to an operating state in response to the sleep cancellation signal.

16. The power receiving side optical communication device according to claim 14, wherein
when the sleep cancellation signal is detected and an amount of accumulated uplink data is equal to or more than a first threshold, the control unit is configured to switch a transmission unit configured to transmit the uplink data from a sleep state to an operating state, and when the sleep cancellation signal is detected and the amount of accumulated uplink data is less than the first threshold, the control unit is configured to switch the reception unit from a sleep state to an operating state in response to the sleep cancellation signal.

17. The power receiving side optical communication device according to claim 14, wherein
when the sleep cancellation signal is detected, the control unit is configured to perform reception processing by switching the reception unit from a sleep state to an operating state regardless of the amount of accumulated uplink data, and when the amount of accumulated uplink data is equal to or more than a first threshold after switching the reception unit from the operating state to the sleep state, the control unit is configured to switch a transmission unit that transmits the uplink data from a sleep state to an operating state.

* * * * *